(12) United States Patent
Kasica et al.

(10) Patent No.: US 6,191,116 B1
(45) Date of Patent: Feb. 20, 2001

(54) HIGHLY SOLUBLE, HYDRATABLE, VISCOUS, SOLUTION STABLE PYRODEXTRINS, PROCESS OF MAKING AND USE THEREOF

(75) Inventors: James J. Kasica, Whitehouse Station; Vincent Choe, Livingston; Erik Kouba, Somerville; Elizabeth Styer, North Brunswick, all of NJ (US)

(73) Assignee: National Starch and Chemical Investment Holding Corporation, Wilmington, DE (US)

(*) Notice: Under 35 U.S.C. 154(b), the term of this patent shall be extended for 0 days.

(21) Appl. No.: 09/067,088

(22) Filed: Apr. 27, 1998

(51) Int. Cl.⁷ .................................................. A61K 31/70
(52) U.S. Cl. ................................................................ 514/23
(58) Field of Search ................................. 127/30; 424/405

(56) References Cited

U.S. PATENT DOCUMENTS

| | | | |
|---|---|---|---|
| 2,845,368 | 7/1958 | Fredickson | 127/38 |
| 3,967,975 | 7/1976 | Idaszak | 127/23 |
| 4,021,927 | 5/1977 | Idaszak | 34/10 |
| 4,237,619 | 12/1980 | Ledding | 34/57 |
| 4,266,348 | 5/1981 | Ledding | 34/10 |

FOREIGN PATENT DOCUMENTS

| | | |
|---|---|---|
| 1150934 | 8/1983 | (CA) . |
| 103460 | 1/1974 | (DE) . |
| 157347 | 1/1981 | (DE) . |
| 208991 | 4/1982 | (DE) . |
| 60-179431 * | 9/1985 | (JP) . |
| 63-041412 * | 2/1988 | (JP) . |
| 322367 | 7/1970 | (RU) . |

OTHER PUBLICATIONS

R.B. Evans and O.B. Wurzburg, "Production and Use of Starch Dextrins" Starch: Chemistry and Technology, vol. II—Industrial Aspects, Chapter XI, pp. 253–278.

P. Toomasik, "The Thermal Decomposition of Carbohydrate, Part II, The Decomposition of Starch" Adv. In Carbohydrate Chem. and Biochem., vol. 47, pp. 279–343.

* cited by examiner

Primary Examiner—Shelley A. Dodson
Assistant Examiner—Alton Pryor
(74) Attorney, Agent, or Firm—Karen G. Kaiser

(57) ABSTRACT

The present invention provides novel pyrodextrins which are substantially 100% soluble in water, and substantially hydratable in a solution which has low free water, at ambient temperature, have high viscosities relative to a canary dexrin and are solution stable. These dextrins are prepared by preferably acidifying the starch, and dextrinizing under substantially anhydrous conditions for a time and at a temperature sufficient to result in the desired end product.

17 Claims, No Drawings

HIGHLY SOLUBLE, HYDRATABLE, VISCOUS, SOLUTION STABLE PYRODEXTRINS, PROCESS OF MAKING AND USE THEREOF

BACKGROUND OF THE INVENTION

The present invention relates to novel dextrins that are highly water soluble, and highly hydratable in a solution which has low free water, at ambient temperature, are viscous relative to a canary dextrin, and are solution stable; the method of preparing them; and their use in a variety of industrial applications.

Starch dextrinization has been known since the early 1800's and may be accomplished by enzyme action, by microbial degradation, by acid hydrolysis, or by heating starch powders either with or without the presence of acid or pH controlling substances (hereinafter "acidifying"). The dextrins formed by heat are known as pyrodexrins and are mixtures of various products of hydrolysis and recombination. Pyrodextrins are generally classified in three groups: white dextrins which are prepared from starch in the presence of an acid catalyst for a relatively short period of time (3–8 hours) at a relatively low temperature (79–120° C.); yellow, or canary, dextrins which are prepared from starch in the presence of an acid catalyst for a more moderate period of time (6–18 hours) at a relatively high temperature (150–220° C.); and British gums which are prepared from starch without any catalyst for long periods of time (10–20 hours) at a relatively high temperature (130–220° C.).

White dextrins and British gums are conventionally up to 95% soluble in water while canary dextrins are conventionally 95 to 100% soluble in water. British gums conventionally form viscous solutions as the name indicates, while white and canary dextrins tend to form relatively less viscous solutions.

The manufacture of pyrodextrins in the dry state is practiced to obtain products which are hydrolyzed or converted to a desired degree and are partially or fully water soluble for a variety of industrial applications. They typically are produced by acidification of the starch, dextrinization, and cooling. In the early stages of dextrinization, hydrolysis is the major reaction due to the presence of high moisture. During the hydrolysis reaction, the molecular weight of the starch is decreased and water is used up. Although some recombination is possible during this phase, recombination is minor until the temperature rises and the water (moisture) level decreases. The hydrolysis process may be accelerated with a catalyst, typically acid.

As the moisture is driven out of the process and temperature continues to increase, the rate of hydrolysis tends to slow down, especially during the latter stages of dextrinization. The processing conditions in the latter stage, namely, high temperature and low moisture, promote recombination of starch molecules which releases water. As recombination occurs, the molecular weight and the branching of the starch increase relative to the hydrolysis product. Further, water is released allowing for further hydrolysis. With time, an equilibrium state is reached between the two reactions, hydrolysis and recombination.

In the traditional dextrinization process, moisture is trapped in the starch bed, particularly in a single phase system, and recombination is in competition with hydrolysis. In a system in which substantially all the free moisture in the system is removed, recombination is in less competition with hydrolysis due to the thorough separation and removal of moisture from the starch. This separation and removal of water results in higher viscosity compositions that still posses all the benefits from the high thermal exposure, particularly high solubility and increased solution stability. Processing dextrins to an anhydrous state is known in the art, producing compositions with a high level of solubility in water at ambient temperatures: however, these tend to be of very low viscosities and/or are not thoroughly hydratable in systems containing little free water, such as in a high solids sugar solution, especially without the addition of heat. There is a need for relatively higher viscosity, thoroughly hydratable dextrin compositions having excellent solution stability characteristics.

Pyrodextrins may be prepared using a variety of equipment, including ribbon agitators, ovens, and fluid bed reactors. Recently, fluid bed reactors have gained favor as better control and reduced time are made possible by the high heat transfer and homogenous mixing characteristic of such equipment.

Dextrinization in fluid bed reactors has been known in the art and produce the same pyrodextrins conventionally known in the art or slight variations thereof. For example, see U.S. Pat. Nos. 2,845,368; 3,967,975; 4,021,927; 4,237, 619; and 4,266,348. Further, a variety of processing parameters have been tried. However, many references stress the importance of using moist air, such as U.S. Pat. No. 3,967, 975; Canadian Patent No. 1,150,934; and German patent applications DD 157 347 and DD 208 991.

Dextrins are used for a variety of industrial applications and their desired characteristics change accordingly. For example, canary dextrins are typically used at high solids, between 1:1.25 to 1:0.75 starch:water ratios or 44.4% to 57.1% solids, to give low viscosity dispersions that make them useful in many application areas. While these qualities are desired in many application areas, there are some applications which require relatively lower solids relationships. For example, a usage level at between 1:4.5 to 1:1 starch/water ratios or 18.1% to 50% solids may be desired. Such compositions made using dextrinization methods known in the art can result in higher viscosity. However, this is done at the sacrifice of solubility and solution stability. Currently, if a high viscosity canary dextrin is produced, it would gain some of the characteristics of a British gum dextrin: that is, the dextrin would be less than 100% soluble in water and not as hydratable.

None of the pyrodextrins currently known in the art are characterized by the specific combination of properties of a relatively high viscosity such as a British gum, 100% solubility In ambient water and solution stable such as a canary dextrin, and high hydratability at ambient temperatures. Typically, high viscosity pyrodextrins never fully hydrate or go into solutions containing limited free water, such as a 60% sucrose solution, without heating. Such properties would be desirable in many applications, particularly in the preparation of confections.

Surprisingly, it has now been discovered that pyrodextrins may be produced which are highly water soluble, and hydratable in a solution which has low free water, at ambient temperature, are viscous relative to a canary dextrin, and are solution stable. These pyrodextrins are produced by drying the starch such that it is substantially anhydrous and effectively removing all the free water in the system.

SUMMARY OF THE INVENTION

The present invention is directed to provide novel pyrodextrins (hereinafter "dextrins") which are substantially 100% soluble in water, and substantially hydratable in a solution which has low free water, at ambient temperature, have relatively high viscosities relative to canary dextrins and are solution stable. These dextrins are prepared by preferably acidifying the starch, and dextrinizing under substantially anhydrous conditions for a time and at a temperature sufficient to result in the desired end product. "Substantially anhydrous conditions," as used herein, is intended to mean that the starch is substantially anhydrous prior to or upon reaching the maximum dextrinization temperature and that all the free water is effectively removed from the system after reaching the maximum dextrinization temperature.

An object of the present invention is to provide a dextrin which is substantially 100% soluble in water, and substantially hydratable in a solution which has limited free water, at ambient temperature, has a high viscosity relative to a canary dextrin, and is solution stable.

Another object of the present invention is to provide a dextrin which is substantially 100% soluble in ambient water, and is substantially hydratable in an ambient solution which has been diluted from 60% to 10% sucrose, has an aborated viscosity of at least 800 cps, and a viscosity which does not change by more than 400% in 72 hours in a 60% sucrose solution.

Still another object of the present invention is to provide a dextrin which is substantially 100% soluble in ambient water, and is substantially hydratable in a solution which has been diluted from 60% to 10% sucrose, has a borated viscosity of at least 50,000 cps, and a viscosity which does not change by more than 100% in 72 hours in a 60% sucrose solution.

Yet another object of the present invention is to provide a method of producing such dextrins by manufacture under substantially anhydrous conditions.

A further object of the present invention is to provide an adhesive, pharmaceutical, food, paper, glass fiber, binder, insecticide, dye, paint, thickener, sizing agent, agricultural product, coating, water treatment product, cosmetic, or textile which contains at least one such dextrin.

A still further object of the present invention is to provide a food product which contains at least one such dextrin.

A yet further object of the present invention is to provide such a dextrin which can be used for coating and film applications, encapsulation, emulsification, or in confection products.

These and other objects of the present invention will become apparent to one skilled in the art from the following detailed description and examples below.

DESCRIPTION OF THE INVENTION

The present invention is directed to provide novel pyrodextrins (hereinafter "dextrins") which are substantially 100% soluble in water, and substantially hydratable in a solution which has low free water, at ambient temperature, have high viscosities relative to canary dextrins, and are solution stable. These dextrins are prepared by optionally acidifying the starch, and dextrinizing under substantially anhydrous conditions for a time and at a temperature sufficient to result in the desired end product.

All starches and flours (hereinafter "starch") are suitable for use herein and may be derived from any native source. A native starch or flour as used herein, is one as it is found in nature. Also suitable are starches and flours derived from a plant obtained by standard breeding techniques including crossbreeding, translocation, inversion, transformation or any other method of gene or chromosome engineering to include variations thereof. In addition, starch or flours derived from a plant grown from artificial mutations and variations of the above generic composition which may be produced by known standard methods of mutation breeding are also suitable herein.

Typical sources for the starches and flours are cereals, tubers, roots, legumes and fruits. The native source can be corn, pea, potato, sweet potato, banana, barley, wheat, rice, sago, amaranth, tapioca, arrowroot, canna, sorghum, and waxy or high amylose varieties thereof. As used herein, the term "waxy" is intended to include a starch or flour containing at least about 95% by weight amylopectin and the term "high amylose" is intended to include a starch or flour containing at least about 40% by weight amylose.

The base starch may be further converted to produce conversion products, including fluidity or thin-boiling starches prepared by oxidation, enzyme conversion, acid hydrolysis, heat and/or acid dextrinization. Thermal and/or sheared products are also useful herein.

The starch may also be chemically, thermally or physically modified. Procedures for modifying starches are described in the Chapter "Starch and Its Modification" by M. W. Rutenberg, pages 22–26 to 22–47, *Handbook of Water Soluble Gums and Resins*, R. L. Davidson, Editor (McGrawhill, Inc., New York, N.Y. 1980). For example, the starch may be crosslinked with bifunctional etherifying and/or esterifying agents such as epichlorohydrin, bis-β-chloroethyl, dibasic organic acids, phosphorus oxychloride, trimethaphosphate, linear mixed anhydrides of acetic and di- or tri-basic carboxylic acids, particularly epichlorohydrin, phosphorus oxychloride, adipic-acetic anhydrides, and sodium trimethaphosphate. The starch may also be cationically or amphoterically treated by well known reagents containing amino, imino, ammonium, sulfonium, or phosphonium groups. Such cationic derivatives include those containing nitrogen containing groups comprising primary, secondary, tertiary and quatemary amines and sulfonium and phosphonium groups attached through either ether or ester linkages.

Dual treatments of starch with cationic and anionic modifying reagents have been used to prepare amphoteric derivatives and are well known in the art. Cationic modification, particularly tertiary amino or quatemary ammonium etherification of starch, typically prepared by treatment with 2-diethylaminoethyl chloride, epoxypropyltrimethylammonium chloride and 4-chloro-2-butenyltrimethylammonium chloride has been combined with further substitution with phosphate, phosphonate, sulfate, sulfonate or carboxyl groups.

Suitable food derivatives include esters, such as the acetate, and half esters, such as the succinate and octenyl succinate, prepared by reaction with acetic anhydride, succinic anhydride, and octenyl succinic anhydride, respectively; phosphate derivatives prepared by reaction with sodium or potassium orthophosphate or sodium or potassium tripolyphosphate; ethers such as hydroxypropyl ether, prepared by reaction with propylene oxide; or any other starch derivatives or combinations thereof.

Physically modified starches, such as thermally-inhibited starches described in the family represented by European Patent Application Publication No. 0 721 471, are also suitable for use herein as are granular pregelatinized and non-granular pregelatinized starches. Processes for preparing pregelatinized starches are known in the art and disclosed for example in U.S. Pat. Nos. 4,465,702, 5,037,929, 5,131,953, and 5,149,799. Conventional procedures for pregelatinizing starch are also known to those skilled in the art and described for example in Chapter XXII- "Production and Use of Pregelatinized Starch", *Starch: Chemistry and Technology*, Vol. III- Industrial Aspects, R. L. Whistler and E. F. Paschall, Editors, Academic Press, New York 1967. Jet-cooking and spray-drying are also known in the art and described in U.S. Pat. No. 3,674,555.

Any starch, flour or blends for use herein may be purified by any method known in the art to remove undesirable flavors, odors, and colors that are native to the starch or created during starch processing. Purification may be carried out prior to and/or after dextrinization. Purification processes known in the art include bleaching, carbon column treatment, ion exchange (both cationic and anionic), steam stripping, ultrafiltration, and combinations thereof such as those described in the family represented by European Patent Application Publication No. 554 818. Alkali washing techniques, for starches intended for use in either granular or pregelatinized form, are also useful and described in the family of patents represented by U.S. Pat. No. 5,187,272.

The starch is typically acidified, conventionally before the dextrinization process, though it may be acidified during the dextrinization process, and either within the dextrinizer or prior to loading. Acidification may be done by any method and using any catalyst known in the art of dextrinization. It may be accomplished by spraying powdered starch with a dilute solution of catalyst such as an acid, salt or other chemical, including the salt of an acid or alkaline reaction, a neutral salt such as calcium chloride, an alkaline substance such as sodium hydroxide or ammonia, or other bases such as borax or sodium carbonate. If an acid is used, it may be any inorganic or organic acid known in the art and acceptable for the end use application of the dextrin. For example, if the dextrin is to be used in a food product, a food grade catalyst is preferred. Typical acids include, but are not limited to hydrochloric, acetic, sulfuric, phosphoric, and nitric acids. The amount of acid used is typically up to about 1%, more particularly up to about 0.25%, by weight of the starch. The starch may also be acidified by introducing gaseous versions of these catalysts which are preferably substantially anhydrous, such as by chlorine gas, hydrogen chloride gas, sulfur dioxide or sulfur trioxide.

The starch must be at least substantially anhydrous after it reaches the maximum dextrinization temperature. A thermal dehydration is carried out by heating the starch in a heating device for a time and at a temperature sufficient to reduce the moisture content to less than about 0.1% by weight, particularly substantially 0%. Conventionally, the temperatures used are less than about the decomposition temperature of the starch, particularly from about 110 to 250° C., more particularly from about 170 to 210° C. The dehydrating temperature can be lower than 100° C., but a temperature of at least about 100° C. will be more efficient for removing moisture. If dehydrated in the dextrinizer, the starch typically is dehydrated as the temperature is brought up to maximum temperature.

The starch is dextrinized for a time and at a temperature sufficient to provide the desired dextrin. In general, maximum temperatures greater than about 110° C. are used for efficiency. The upper limit of the temperature is typically about 300° C. as if starch is held above this temperature for a significant time, the starch begins to decompose. Typical maximum temperatures are from about 110 to 250° C., particularly from about 170 to 210° C.

The dextrinization process is allowed to proceed at maximum temperature until the dextrins are substantially 100% soluble in ambient water as measured by Procedure B in the Examples section. In general, the starch will be substantially soluble about thirty minutes to six hours after maximum temperature is reached in the dextrinizer. Dextrinization at the maximum temperature is then allowed to proceed further until the remaining characteristics are achieved, hydratability, viscosity, and solution stability, typically an additional about two to six hours.

Although holding the temperature at the maximum until the dextrinization is complete is generally most efficient, the dextrins of the present invention may also be achieved using variable temperature.

The temperature and time selected will depend upon the amount of hydrolysis and recombination desired and the desired starch characteristics to be obtained. In general, longer times are required at lower temperatures to obtain the desired starch.

The source and type (base) of the starch, the dehydrating conditions, the heating time and temperature, and the equipment used are all interrelated variables that affect the hydrolysis and recombination and thus the properties of the resultant starch.

The dextrinization may be performed at normal pressures, under vacuum or under pressure, and may be accomplished by conventional means known in the art, particularly by the application of heat in substantially anhydrous fluidizing gas, particularly air or an inert gas.

The thermal dehydrating and dextrinization steps may be continuous and concurrent, accomplished by the application of heat to the starch beginning from ambient temperature. The moisture will be driven off during the heating and the starch will become anhydrous or substantially anhydrous.

The dextrinization can be carried out in the same apparatus in which the thermal dehydration occurs as long as the desired degree of hydrolysis is obtained before the starch is substantially dehydrated. Most conveniently the processes are concurrent with the thermal dehydration and dextrinization occurring in the same apparatus, as when a fluidized bed is used. The process of making the dextrins of the instant invention may be batch or continuous.

The dehydrating and dextrinization apparatus can be any industrial oven, conventional oven, microwave oven, dextrinizer, dryer, mixer or blender equipped with heating devices and other types of heaters, provided that the apparatus is fitted with a vent to the atmosphere so that moisture is removed, not only the moisture initially in the starch, but also that produced during processing. A fluid bed reactor is particularly suitable for processing the dextrins of the instant invention.

In particular, the apparatus is a fluid bed reactor, particularly one in which the apparatus is equipped with a means for removing water vapor, such as a vacuum or a blower to sweep the air or fluidizing gas from the head-space of the fluidized bed. Suitable fluidizing gases are generally inert and include air and nitrogen. For safety reasons, a gas containing less than 12% oxygen is particularly suitable. The only limitation is that the gaseous phase must be such that the free water is effectively removed from the system, particularly after maximum temperature is reached. Such conditions are particularly met when the fluidizing gas is pretreated such that it is hot and substantially anhydrous. This two-phase process, gas-solid, is highly efficient at removing substantially all the free moisture from the system.

After dextrinization, the dextrins are cooled. The resultant dextrin may be used as is or further modified by techniques known in the art, depending upon the intended end use application. For example the dextrins may be further converted as known in the art and described in the various US patents assigned to Matsutani Chem. Ind., Ltd.

The odor, color and/or flavor may be improved by techniques known in the art, including washing the starch or flour with water and/or removing protein and/or lipid from the starch or flour prior to the dehydrating step and/or after the heat treating step. A bleaching agent (e.g., sodium chlorite) or an alkali can be used for the protein and/or lipid removal.

The resultant dextrins may also be adjusted to the desired pH according to their intended end use. In general, the pH is adjusted to the range of from about 5.0 to about 7.5, particularly from about 6.0 to about 7.0, using techniques known in the art.

The resultant dextrins may also be physically, or chemically modified to achieve the desired characteristics for the intended end use application. For example, the dextrins may be agglomerated for quicker dispersibility. The dextrins may also be rehumidified.

The resultant dextrins are typically yellow to light tan in color, similar to a canary dextrin. Although the slight color is not detrimental in many applications, the color may be reduced by a variety of methods known in the art if a dextrin with less color is desired.

The resultant dextrins are substantially 100% soluble in ambient water using Procedure B of the Examples section. High solubility is an essential characteristic for may end use applications.

Further the resultant dextrins are substantially hydratable. Substantially hydratable, as used herein, means the dextrin is substantially hydratable in a solution which has low free water at ambient temperature such that the solution is clear, not cloudy, and that the dextrin does not substantially settle out. In particular, the dextrins are substantially hydratable in a sucrose solution as prepared by Procedure A in the Examples section such that the dextrins hydrate/solubilize resulting in a clear solution, and less than about 2 cm, particularly less than about 1 cm, sediment settles out after 24 hours. Other dextrins which do not hydrate may still result in a clear "solution" with a granular sediment as the dextrin simply settles out without any hydration/dissolution: these dextrins are not intended to fall within the scope of the present invention as they do not form a solution. Typically, other viscous dextrins are not hydratable without the addition of heat when the amount of free water is limited in a solution.

The resultant dextrins have a relatively high viscosity, higher than that of a conventional canary dextrin. In particular, the dextrins have a borated viscosity of at least about 800 cps, particularly at least about 10,000 cps, more particularly at least about 50,000 cps, as measured by Procedure C in the Examples section.

Finally, the dextrins are solution stable such that the solution viscosity of the dextrins does not change drastically over time using Procedure D in the Examples section. Particularly, the solution viscosity changes by less than 400%, more particularly by less than 200%, most particularly by less than 100% in 72 hours. Certain other dextrins may appear to be solution stable. However, it should be checked that the dextrin hydrated/dissolved, and did not simply settle out: if the dextrin simply settles out, the solvent viscosity will not tend to change.

The dextrins of the present invention can be used in a variety of industrial applications including adhesives, pharmaceuticals, foods, paper, glass fibers, binders, insecticides, dyes, paints, thickeners, sizing agents, agricultural products, coatings, water treatment products, cosmetics, and textiles. In particular, they are useful for coating and film applications, encapsulation, emulsification, and in confection products.

The coating and filming properties of the instant dextrin composition show utility in pan coating operations. Panning, or the coating of candies by rotating them in a coating material in a revolving pan can be accomplished by coating with a concentrated sugar solution which contains a film forming agent. Typically, in the coating of soft finished goods such as jelly bean centers, an engrossing syrup containing a film former is used. Film formers are hydrocolloids known for their high degree of water solubility and relatively low, solution stable viscosity. Such attributes allow high solids solutions to be prepared and thinly and uniformly applied as coatings and films over time. Film formers are used in the engrossing syrup because of their moisture absorbing and film forming ability. These attributes help to plasticize the coating as it dries, thus preventing cracking and chipping as well as preventing sweating of the engrossed jelly bean. Adhesive film forming properties are also required.

The dextrins of the instant invention are further useful as gum arabic replacers in a variety of applications for the functions of emulsification, encapsulation, coating, thickening, film forming, texturizing, and structuring. For example, these dextrins may effectively be used to stabilize flavor oils in soft drinks, provide structure and coating to candies, emulsify pourable salad dressings and butter sauces, provide the glaze base for bakery products, and emulsify and/or encapsulate a variety of flavors, fats, and oils for food and vitamin applications.

The following examples are presented to further illustrate and explain the present invention and should not be taken as limiting in any regard.

EXAMPLES

The following test procedures were used throughout the examples.

PROCEDURES:

A. Hydratability (Sediment- cm/Supernatant in Sugar Solution)

| Ingredients | Weight Percent |
| --- | --- |
| Distilled Water | 34.78% |
| Dextrin | 21.74% |
| Extra Fine Sugar | 43.48% |

The sugar and dextrin are dry blended. The dry blend sugar mixture is thoroughly dispersed in water. The dispersion is allowed to stand overnight (at least 12 hours) and is then diluted with water to form a 10% solids (wt/wt) dispersion. The sugar solution is poured into a 50 mL graduated, glass settling (centrifuge) tube with a conical bottom. The dilution is allowed to stand, undisturbed for 24 hours. The cm of sediment is measured and the nature of the supernatant is observed (clear, cloudy).

Settled material and cloudiness indicates a lack of hydratability of the sample in a high solids sugar solution. A sample may be perceived as soluble in water; however, the hydratability in a high solids solution is critical in many applications, and particularly relates the composition being tested to the actual performance as a film former in panning operations.

B. Solubility (% in Water)

Two grams of the dextrin are wetted out in a small beaker, quantitatively transferred to a 200 mL volumetric flask, and diluted to approximately 1 mL of the 200 mL mark with ambient temperature distilled water. The flask is stoppered and mixed by inverting the flask for two minutes. The flask is placed in a 22.2±0.4° C. environment for four hours. At the end of the 4 hours, the dextrin is diluted to 200 mL with ambient distilled water and mixed by inverting the flask for two minutes. The contents are filtered through Whatman Number 1 or equivalent filter paper. A 50 mL aliquot of the filtrate is pipetted into previously dried, tared 100 mL beakers one-third filled with a pure laboratory grade of sand and evaporated to dryness overnight in a 105° C. oven. The sample is removed and placed in a zero % relative humidity desiccator and allowed to cool. The beakers are then removed from the desiccator and weighed immediately on an ppropriate analytical balance. The solubility is calculated as follows, running each sample in duplicate and averaging the results.

$$\text{Solubility}(\% \text{ in water}) = \frac{\text{Weight of residue} \times 100}{\text{Weight of sample(dry basis)}}$$

C. Borated Viscosity

Viscosity is measured as borated viscosity using a Brookfield viscometer. An enamel cup and thermometer are tared (tare weight). 66.6 grams of anhydrous sample are weighed into the cup. Water is added and the sample is mixed well to uniformly wet out and form a paste. Additional water is added to bring the starch mixture weight to 200 grams. The mixture is then placed in a boiling water bath and brought to 90° C. with constant stirring. The mixture is next placed in an ice bath and cooled to 70° C. with constant stirring. 9.99 grams borax are then added and the sample is stirred for the five minutes while maintaining a temperature of 70° C. The mixture is then replaced in an ice bath and cooled to 25° C. with constant stirring. The mixture is brought back to weight by replacing lost moisture with water. The viscosity is then read using a Brookfield Model DV-11+ Viscometer (commercially available from Brookfield) at 25° C., 20 rpm, and an appropriate spindle.

D. Solution Viscosity and Stability

| Ingredients | Weight Percent |
|---|---|
| Distilled Water | 34.78% |
| Dextrin | 21.74% |
| Extra Fine Sugar | 43.48% |

The sugar and dextrin are dry blended. The dry blend sugar mixture is thoroughly dispersed in water. The solution viscosity in cps is measured using a Brookfield Viscometer (Model DVII+, B spindle at setting 92S, 12 rpm) after 15 seconds at time=0, 24, 48, and 72 hours. The percent change in cps viscosity, from 0 hour to 72 hour, is used to measure the relative stability of the composition in the high sugar system.

The solution stability is determined by the formula:

$$\text{Solution Stability} = \frac{cps@72\ \text{hour} - cps@0\ \text{hour}}{cps@0\ \text{hour}} \times 100$$

In order for a meaningful reading to be obtained, the dextrin must be soluble/hydratable in the sucrose solution. If the dextrin simply settles out, the viscosity of the solvent, not the dextrin solution, is being measured.

E. Moisture %

The percent moisture of all samples is determined using the Cenco Moisture balance (commercially available from CSC Scientific Company, Inc.) and run according to the manufacturer's instructions. The Cenco Moisture balance is a sensitive torsional balance for weighing samples using an infrared heat lamp for drying the sample. The percentage loss in weight of the sample is due to the loss of moisture.

F. Color (L Value)

The Hunter Colorimeter can be used to measure a multitude of color scales and optical properties of a dry powder sample of dextrin. A Hunter ColorQUEST spectrocolorimeter sphere model (commercially available from Hunter Associates Laboratory, Inc., Reston, Va.) is used with an NIR compression cell with quartz window (commercially available from Bran-Luebbe, Inc., Buffalo Grove, Ill.) and run according to the manufacture's instructions using the following parameters: Scale=L, Observer angle=10, Illuminant=D65, Reflectance setting=RSIN, Viewing area Size=LAV and Ultraviolet Filter=out.

Example 1—Manufacture of Invention Dextrins in a Fluid Bed Reactor Using Tapioca Starch A fluid bed reactor was charged with 100 parts of tapioca starch having a moisture content of 7.4% and a pH of 4.5 at 20% solids. The starch was fluidized using substantially anhydrous air. Then the fluidized starch was acidified by adding anhydrous hydrochloric gas into the fluidizing air stream until the starch had a pH of 3.9 at 20% solids.

To initiate the dextrinization process, the fluidizing air and the outer steam jacket of the reactor were heated to obtain a maximum starch temperature of 185° C. within three hours. The moisture content of the starch dropped from 7.4% to 0.0% within two hours.

Once the starch reached the maximum temperature of about 185° C., time equal 0 or (t=0), the processing conditions described above were held for an additional 6 hours (t=6:00). Samples were taken every ½ hour from t=0 and allowed to cool to ambient temperature. Once t=6:00 was reached, the fluidizing starch bed was cooled by lowering the air inlet temperature and adding water to the outer jacket to bring the starch to ambient temperature.

The results are summarized in Table I, below.

TABLE I

| Time (hr) | Moisture (%) | Borated Viscosity (cps) | % Solubility (in water) | Hydratability (cm sediment, solution appearance) | Color (L Value) |
|---|---|---|---|---|---|
| 0.00 | 0.0 | — | 21 | 3.5 cm, clear* | 91.0 |
| 0.50 | 0.0 | — | 56 | — | — |
| 1.00 | 0.0 | — | — | 4 cm, cloudy | — |
| 1.50 | 0.0 | 121,800 | — | — | 89.5 |
| 2.00 | 0.0 | — | 100 | 4 cm, cloudy | — |
| 2.50 | 0.0 | 102,600 | 100 | — | — |
| 3.00 | 0.0 | 79,600 | 100 | 2 cm, cloudy | 88.1 |
| 3.50 | 0.0 | — | 100 | — | — |
| 4.00 | 0.0 | 67,500 | 100 | 0.5 cm, clear | — |
| 4.50 | 0.0 | — | 100 | — | 86.4 |
| 5.00 | 0.0 | 31,750 | — | <0.25 cm, clear | — |
| 5.50 | 0.0 | — | 100 | — | — |
| 6.00 | 0.0 | 13,600 | 100 | trace, clear | 85.7 |

*This sample was clear as the dextrin remained largely granular under these test conditions and did not go into solution/hydrate.

The borated viscosity at t=0.00, 0.50, and 1.00 hours was out of the desired range.

As can be seen from Table I, by t>2 hours, the dextrin is soluble in ambient water. However, it is not until t>3 hours that the dextrin is hydratable in the sugar solution as evidenced by the clear appearance of the "solution."

Example 2—Manufacture of Invention Dextrins Using OSA Waxy Starch

Waxy corn starch is added under agitation into water to form a slurry at approximately 40% solids. The pH is adjusted to 7.5 with a 3% (w/v) aqueous solution of sodium hydroxide. A 3% treatment of octenylsuccinic anhydride (OSA) is conducted by adding the reagent to the slurry while maintaining the pH at 7.5 with the dilute sodium hydroxide solution. The reaction is complete when the pH stabilizes without further addition of the dilute sodium hydroxide solution. The pH is adjusted to 3.0 with a dilute acid solution. The reacted starch is then dewatered and dried to approximately 12% moisture using the methods and equipment known in the art. This results in an OSA modified starch.

The OSA modified starch is dextrinized according to the method described in Example 1.

Example 3—Comparison with Traditional Dextrins

A. An oil-jacketed, ribbon-type blender (a traditional dextrinizer) is charged with 100 parts of tapioca starch having a moisture content between 4 to 6% and a pH of 4.5 in a 40% solids slurry. A 1N hydrochloric acid solution is spray atomized onto the agitated starch bed until a pH of 3.2 in a 40% solids slurry is obtained. The oil jacket is heated to obtain a starch bed temperature of 185° C. in 2 to 4 hours. The maximum starch temperature is held constant for an additional 6 hours to produce a canary dextrin made by the traditional process.

B. A dextrin is made according to the procedure of Example 3A, except that the maximum starch temperature is lowered to 160° C. The resulting dextrin is a canary dextrin having a higher viscosity than in Example 3A.

C. A dextrin is made according to the procedure of Example 3A, except that the pH is lowered to 3.9 in a 40% solids slurry. The resulting dextrin was an attempt to produce a high viscosity canary dextrin using the traditional process; however, solubility and solution stability of a canary were not obtained.

The results are summarized in Table II, below.

TABLE II

| Sample | Moisture (%) | Viscosity (cps) | % Solubility (in water) | Hydratability (cm sediment, solution appearance) | Color (L Value) |
|---|---|---|---|---|---|
| Example 1 (t = 3) | 0.0 | 79,600 | 100 | 2 cm, cloudy | 88.1 |
| Example 1 (t = 6) | 0.0 | 13,600 | 100 | trace, clear | 85.7 |
| Example 3A | ≦0.5 | 64 | 100 | trace, clear | 90.5 |
| Example 3B | ≦0.5 | 812 | 99.0 | 0.25 cm, clear | 92.5 |
| Example 3C | ≦0.5 | 28,500 | 70.1 | 1.5 cm, clear* | 93.6 |

*This sample was clear as the dextrin remained largely granular under these test conditions and did not go into solution/hydrate.

As can be seen from Table II, only the dextrin of the present invention has a relatively high viscosity in addition to being 100% soluble in water, and hydratable. As the viscosity of traditional dextrins increase, the water solubility and hydratability decrease.

Example 4—Comparison of Solution Viscosity and Stability over Time of Traditional and Invention Dextrins The solution viscosity and stability of the dextrins from Examples 1 and 3, above, were determined using Procedure D. The results are summarized in Table III, below.

TABLE III

| Composition | Viscosity (cps) (t = 0) | Viscosity (cps) (t = 24) | Viscosity (cps) (t = 48) | Viscosity (cps) (t = 72) | Stability (% Change) |
|---|---|---|---|---|---|
| Example 3A | 466 | 833 | 900 | 2766 | 494% |
| Example 3B | 400 | 466 | 500 | 3233 | 708% |
| Example 3C | 200 | 200 | 200 | 200 | 0% |
| Example 1, t = 0 | 133 | 133 | 166 | 200 | 50% |
| Example 1, t = 1 | 200 | 233 | 266 | 300 | 50% |
| Example 1, t = 2 | 466 | 566 | 633 | 633 | 36% |
| Example 1, t = 4 | 2066 | 2966 | 3033 | 3066 | 48% |
| Example 1, t = 6 | 4300 | 5400 | 5233 | 5466 | 27% |
| Gum Arabic[a] | 3500 | 3633 | 3800 | 3800 | 9% |

[a]The gum arabic used was a confectionary grade powder (non-spray dried) typically used as film coating agent.

As can be seen from Table III, the viscosity of the dextrins of the instant invention are significantly more solution stable than canary dextrins 3A and 3B though not as stable as the gum arabic. The dextrin of Example 3C is not truly solution stable. Although the viscosity of this dextrin does not change over time, it is not soluble/hydratable in the 60% sugar solution (see Table II) and therefore is present as a compact sediment at the bottom of the test sample.

Example 5—Use of the Invention Dextrins as an Engrossing Syrup

| Ingredient | Weight Percent |
|---|---|
| Water | 17% |
| Dextrin of Example 1 (t = 6) | 5% |
| Sugar | 33% |
| Corn Syrup (42DE) | 45% |

The water and dextrin are mixed until well dispersed. The sugar is added and mixed until dissolved. The corn syrup is then added and mixed until dissolved.

Example 6—Use of the Invention Dextrins as a Pan Coating

| | Ingredient | Weight Percent |
|---|---|---|
| A. | Dextrin of Example 1 (t = 6) | 33% |
| | Water | 76% |
| B. | Granulated Sugar | 62% |
| | Water | 21% |
| | Dextrin of Example 1 (t = 6) | 17% |

Chocolate, peanut or candy centers are placed in a revolving pan and dampened with syrup A made by dissolving the dextrin in the water. These coated centers are dried with powdered sugar. This coating procedure is repeated until the desired coating is accomplished. The centers are removed from the pan and allowed to dry overnight.

Syrup B made by dissolving the dextrin and sugar in water is applied to the candies in eight wettings with powdered sugar dusted in for drying between each cycle.

A syrup containing granulated sugar is then used, with color and flavor, to further buildup coatings. Candies are then polished.

Note: Most dextrins known in the art require a heating step in order to fully solubilize the dextrin in these high sugar systems. The dextrins of the instant invention do not require such heating steps.

Example 7—Use of the Invention Dextrins as an Encapsulating Agent

| a. Ingredient | Weight Percent |
| --- | --- |
| Dextrin of Example 2 | 32.0 |
| Flavor Oil | 8.0 |
| Water | 73.0 |

The dextrin is suspended in water under moderate agitation until the solution is smooth and free of lumps. The flavor oil is slowly added under slow agitation. The mixture is homogenized and then spray dried to result in an encapsulated oil.

b. Example 7a is repeated using 8.0 grams of the dextrin of Example 1 (t=6) and 24.0 grams of the dextrin of Example 2.

Example 8—Use of the Invention Dextrins as an Emulsifier

| a. Ingredient | Weight Percent |
| --- | --- |
| Dextrin of Example 2 | 11.0 |
| Citrus Oil | 10.0 |
| Citric Acid | 0.3 |
| Sodium Benzoate | 0.1 |
| Water | 78.6 |

The sodium benzoate and citric acid are added to the water. The dextrin is then added to the mixture under moderate agitation until fully dispersed. The citrus oil is next mixed in under vigorous agitation for fifteen minutes. The mixture is then pressure homogenized using two passes at 2500 psi to achieve an emulsion.

b. Example 8a is repeated using 2.75 grams of the dextrin of Example 1 (t=6) and 8.25 grams of the dextrin of Example 2.

Example 9—Use of the Invention Dextrins as a Film Coating

| Ingredient | Weight Percent |
| --- | --- |
| Dextrin of Example 1 (t = 6) | 17.0 |
| Water | 73.9 |
| Salt | 9.1 |
| Seasoning | As desired |

The dextrin is added to the water and optionally heated to 160° F. The dextrin solution is held at this temperature for five minutes and then the salt and seasoning are mixed in. Peanuts are then dipped into this solution and roasted to form seasoned peanuts.

Example 10—Use of the Invention Dextrins to Make a Hard Gum Confection

| Ingredient | Weight Percent |
| --- | --- |
| Dextrin of Example 1 (t = 6) | 30.0 |
| 42 DE Corn Syrup | 30.0 |
| Sucrose | 20.0 |
| Water | 20.0 |
| Acid, Color, Flavors | As desired |

The corn syrup is heated to 77° C. In a separate kettle, the dextrin is mixed into the water with moderate agitation. The corn syrup and sugar are added with continued mixing and heated to 88° C. The hot slurry is then jet cooked at 135° C. The acid, color, and flavor are added and mixed well. The mixture is deposited in molds and dried at 54° C. until total solids are at least 88% to produce hard candies.

What is claimed:

1. A dextrin characterized by:
    a. substantially 100% soluble in ambient water,
    b. substantially hydratable in an ambient solution which has low free water such that solution is clear;
    c. a borated viscosity greater than about 800 cps.
    d. solution stability.

2. The dextrin of claim 1, wherein the borated viscosity is greater than about 10,000 cps.

3. The dextrin of claim 3, wherein the borated viscosity is greater than about 50,000 cps.

4. The dextrin of claim 1, wherein the solution viscosity does not change by more than 400% in 72 hours.

5. The dextrin of claim 4, wherein the solution viscosity does not change by more than 100% in 72 hours.

6. The dextrin of claim 1, wherein the dextrin is substantially hydratable in a 60% solids sucrose solution at ambient temperature.

7. A process of manufacturing a dextrin comprising:
    a. dehydrating a starch to substantially anhydrous prior to reaching maximum dextrinizing temperature; and
    b. dextrinizing under substantially anhydrous conditions at the maximum dextrinizing temperature until the starch is substantially 100% soluble in ambient water, substantially hydratable in an ambient solution with low free water, has a borated viscosity greater than about 800 cps, and is solution stable.

8. The process of claim 7, wherein the maximum dextrinization temperature is from about 110° C. to about 250° C.

9. The process of claim 8, wherein the maximum dextrinization temperature is from about 110° C. to about 210° C.

10. The process of claim 7, wherein dextrinization at maximum temperature is for about 2.5 to about 12 hours.

11. The process of claim 7, further comprising acidifying the starch.

12. The process of claim 7, wherein the dextrinization takes place in a fluid bed reactor.

13. The process of claim 12, wherein a pretreated fluidizing gas is used, said fluidizing gas being heated and at least substantially anhydrous.

14. A composition comprising the dextrin of claim 1.

15. The composition of claim 14, wherein the composition is selected from the group consisting of adhesives, pharmaceuticals, foods, paper, glass fibers, binders, insecticides, dyes, paints, thickeners, sizing agents, agriculture, coatings, water treatment, cosmetics, and textiles.

16. The composition of claim 14, wherein the dextrin is a coating, a film, an encapsulant, or an emulsifier.

17. The composition of claim 15, wherein the composition is a confectionery product.

* * * * *